"" "" "" (12) United States Patent
Tierney et al.

(10) Patent No.: US 8,035,475 B2
(45) Date of Patent: Oct. 11, 2011

(54) QUICK CONNECT FITTINGS

(75) Inventors: Brian M. Tierney, Newfane, NY (US);
Paul Grzeskowiak, Wheatfield, NY (US)

(73) Assignee: Kanthal Corporation, Bethel, CT (US)

( * ) Notice: Subject to any disclaimer, the term of this patent is extended or adjusted under 35 U.S.C. 154(b) by 432 days.

(21) Appl. No.: 12/191,322

(22) Filed: Aug. 14, 2008

(65) Prior Publication Data

US 2010/0039210 A1 Feb. 18, 2010

(51) Int. Cl.
*H01C 1/082* (2006.01)
(52) U.S. Cl. .......... 338/55; 338/231; 29/610.1; 438/382
(58) Field of Classification Search .......... 338/220–222, 338/231–232, 55; 29/610.1; 438/382
See application file for complete search history.

(56) References Cited

U.S. PATENT DOCUMENTS

| | | | |
|---|---|---|---|
| 2,254,838 A | 9/1941 | Conklin et al. |
| 2,491,872 A | 12/1949 | Neuman |
| 2,491,876 A | 12/1949 | Shoenfeld et al. |
| 2,915,729 A | 12/1959 | Campbell |
| 4,417,389 A | 11/1983 | Lopacki et al. |
| 4,862,135 A | 8/1989 | Broadhurst |
| 4,912,452 A | 3/1990 | Koleyni |
| 4,946,205 A | 8/1990 | Washizu |
| 5,131,859 A | 7/1992 | Bowen et al. |
| 5,335,311 A | 8/1994 | Groothuizen |
| 6,471,530 B1 | 10/2002 | Gimbatti et al. |
| 6,913,292 B2 | 7/2005 | Snyder, Sr. et al. |
| 6,943,661 B2 | 9/2005 | Janicek et al. |
| 7,121,593 B2 | 10/2006 | Snyder, Sr. et al. |

OTHER PUBLICATIONS

International Search Report and Written Opinion mailed Sep. 15, 2009 issued in PCT Application No. PCT/US2009/052181.

*Primary Examiner* — Kyung Lee
(74) *Attorney, Agent, or Firm* — Drinker Biddle & Reath LLP

(57) ABSTRACT

A resistor assembly and method of assembling a resistor to a coupling, comprises providing a resistor having a first end and a second end, the resistor being tubular in shape and providing a coupling housing having an open end for receiving the first end of the resistor, the coupling housing including a sealing member, a retainer, and a support washer. The retainer is interposed between the support washer and sealing member. The first end of the resistor is inserted into the open end of the coupling housing. The tube is rotated within the coupling housing so that the resistor is in sealing engagement with the sealing member and retained by retaining member.

15 Claims, 1 Drawing Sheet

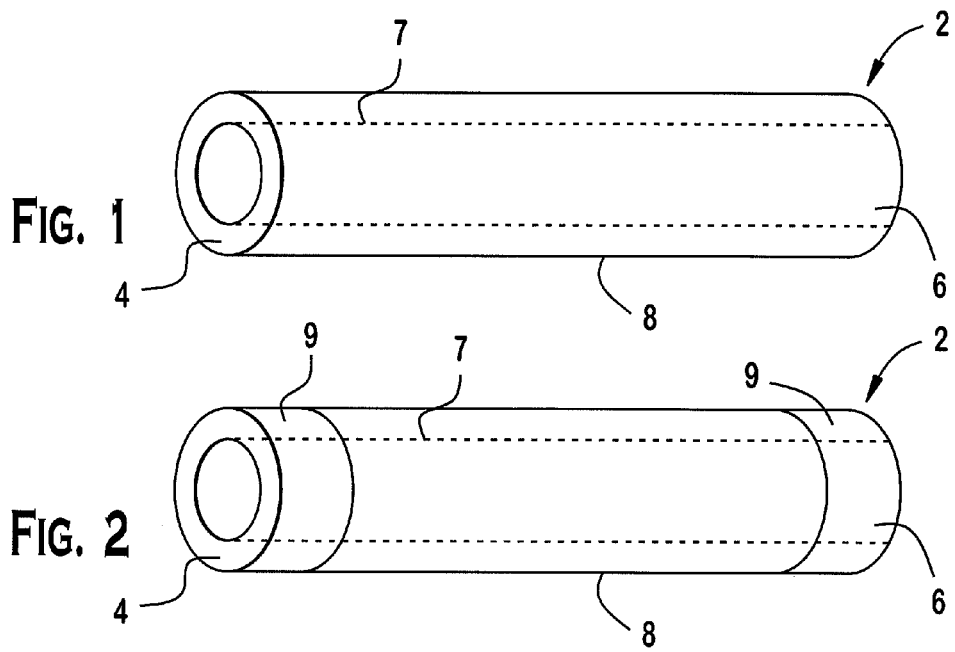
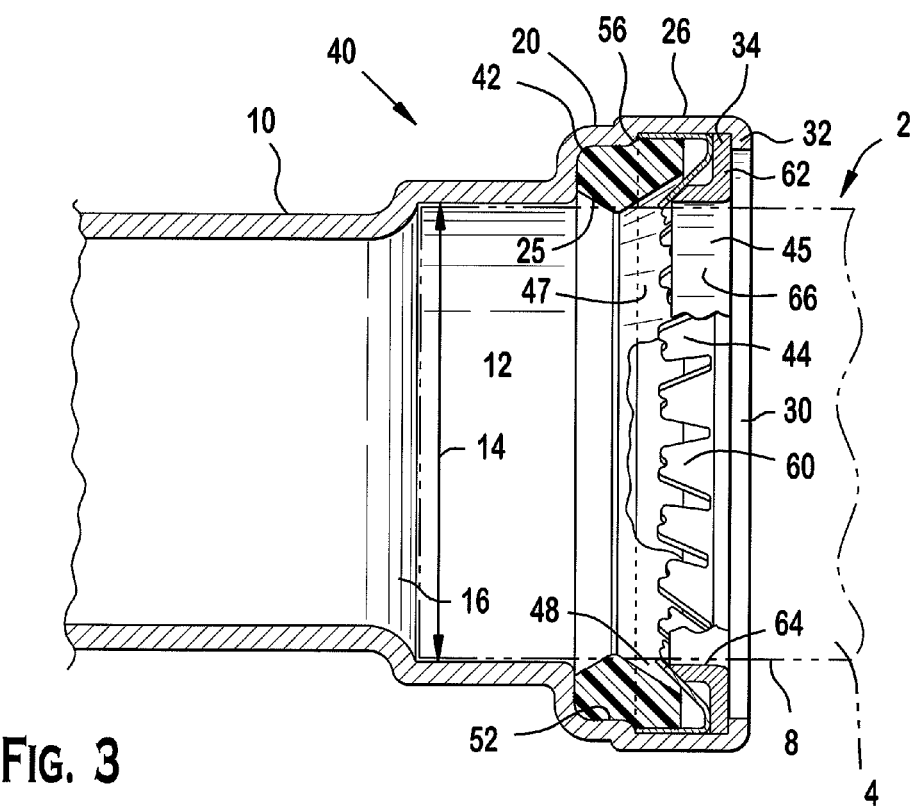

QUICK CONNECT FITTINGS

FIELD OF THE INVENTION

The present invention relates to couplings for resistors. More particularly, the present invention relates to couplings for resistors that are liquid-cooled.

BACKGROUND OF THE INVENTION

Resistors are electronic components used in various applications. Three prevalent types of resistors are: wire wound, film, and bulk. A wire wound resistor comprises a spiral of conductive material (normally metal wire or metal strip) wrapped around a ceramic rod or tube. A film resistor comprises a film of resistive material (normally carbon based or metallic oxide film) formed around a ceramic rod or tube. A bulk resistive resistor comprises a mixture of non-conductive ceramic material and conductive material.

Bulk resistive resistors are used in various high performance applications. Bulk resistive resistors may take the form of tubular, axial leaded, slab, and disc and washer resistors. With regard to tubular resistors, these typically include a bulk resistive material such as ceramic, having metal terminals or sleeves disposed at its end. Ceramic resistors are able to withstand short-time overloads and high peak power. They are chemically inert and thermally stable.

Difficulties arise when attempting to join the resistor to a coupling, which is typically metal. To solve this problem, metal ends are attached to the tube by etching off a portion of the tube, and attaching a metal sleeve. The coupling and tube are then soldered together. However, soldering is time-consuming and expensive. In addition, if the coefficient of thermal expansion differs between the tube and coupling, the joint will not be reliable and may result in cracking.

Another method includes attaching the coupling to an end of a tube with bonding material, such as epoxy or adhesives. A bonding material is interposed between the coupling and the tube. Like soldering, this method is time-consuming and expensive. In addition, the epoxy may deteriorate over time, possibly compromising the joint.

Additional problems are present with the use of resistors that are liquid-cooled. Liquid-cooled resistors are capable of dissipating more power in a smaller package. For example, air-cooled resistors dissipate approximately 370 watts of power whereas liquid-cooled resistors dissipate approximately between 3,000-4,000 watts of power. However, other problems may arise when joining the resistor in the liquid containing network. In particular, manufacture and use of a liquid-cooled resistor is difficult, particularly when making a joint. Because of the liquid factor, the coupling must be adequately sealed or leakage will occur.

To solve the problems of leakage, complicated mechanical couplings are used as an alternative to the soldering and bonding processes. For example, plastic ends of a liquid connection are held in compression with tie rods and an O-ring. An O-ring creates a liquid tight seal while the tie rods hold the plastic ends in compression. However, this type of mechanical connection is rather complicated and expensive.

Therefore, there is a need in the art for a connection between a coupling and a resistor that is simple, inexpensive, reliable and easy to assemble.

SUMMARY

According to a first aspect of the present invention, a method of assembling a resistor to a coupling in a liquid-containing network, comprises providing a resistor having a first end and a second end, the resistor being tubular in shape and providing a coupling housing having an open end for receiving the first end of the resistor, the coupling housing including a sealing member, a retainer, and a support washer. The retainer is interposed between the support washer and sealing member. The first end of the resistor is inserted into the open end of the coupling housing. The tube is rotated within the coupling housing so that the resistor is in sealing engagement with the sealing member and retained by retaining member.

According to a second aspect of the present invention, a resistor assembly comprises a resistor having a first end and a second end, the resistor being tubular in shape, a coupling housing having an open end for receiving the first end of the resistor, the coupling housing including a sealing member, a retainer, and a support washer, the retainer being interposed between the support washer and sealing member, wherein the first end of the resistor is inserted into the open end of the coupling housing and rotated within the coupling housing so that the resistor is in sealing engagement with the sealing member and retained by retaining member.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements.

FIG. 1 is a perspective view of a resistor according to a first embodiment of the present invention.

FIG. 2 is a perspective view of a resistor according to a second embodiment of the present invention.

FIG. 3 is a cross sectional view of the coupling and resistor according to the present invention.

DETAILED DESCRIPTION OF THE PREFERRED EMBODIMENTS

The method and device of the present invention is adapted to be used to "quick-connect" any type of resistor, such as film, wire wound or ceramic. This method and device is particularly useful for connecting resistors in a liquid network, such as water. However, it should be understood that other liquids may be used for cooling the resistor, such as oils (e.g., mineral oil or dielectric oil), ethylene glycol water mixtures, ethylene glycol or other fluids used as coolants or for removing heat. In addition, the method and device of the present invention is also applicable to resistors that are not contained in a liquid network.

FIGS. 1 and 2 illustrate the basic features of a liquid-cooled ceramic tube according to the present invention. However, it should be understood that the present invention applies to all types of resistors, according to application and design preference. With reference in particular to FIG. 1, a ceramic tube 2 includes a first end 4 and a second end 6 with an inner surface 7 and an outer surface 8. Ceramic tube 2 is adapted to be placed in a system so that it is either electrically conductive or electrically insulating. Preferably, the ceramic tubes according to the present invention are sized to be used in high performance applications. However, the present invention may be used in accordance with other lower performance applications.

With reference to FIG. 2, the ceramic tube 2 may include metal termination portions 9 at the first end 4 and the second end 6. This allows the ceramic tube to be placed into a system so that it is electrically conductive, while allowing water or other fluid to enter the inside surface of the tube for cooling. The liquid-cooled resistors according to the present invention preferably operate in the range of 3,000-4,000 watts, but this range may be lower or higher depending on design preference and application.

FIG. 3 shows a modified version of FIG. 2 from U.S. Pat. No. 6,913,292, which patent is incorporated by reference herein. As described therein, the coupling housing 10 includes a socket 12 with an inner diameter 14 sized according to receive an end of a tube to interfit within the socket 12. However, different from the application described therein, the present invention applies the coupling to all types of resistors.

FIG. 3 shows a coupling 40 according to the invention assembled from its various components including coupling housing 10, a sealing member 42, a retainer 44 and a support washer 45. A tube end 4 is shown in phantom line received within the coupling 40. As shown in FIG. 3, the inner diameter 14 of socket 12 is sized to receive and support the tube end 4. Stop surface 16 engages pipe end to position it properly within coupling 40 and prevent it from passing through the coupling housing 10.

Sealing member 42, positioned adjacent to socket 12, is preferably an elastomeric ring having an angularly oriented circumferential surface 47 sloping toward the open end 30 of the coupling housing 10. The sloping surface 47 acts as a guide to align the tube end 4 with the socket 12 and thus helps protect the seal from insertion damage due to misalignment between the tube end 4 and the coupling 40. The sloping surface 47 also causes a reduction in the insertion force required to seat a tube end 4 into the coupling 40.

A fluid-tight seal is effected between the coupling housing 10 and the tube end 4 by compressing the sealing member 42 in the annular space 48 between the outer surface 8 of tube end 4 and the inside surface 52 of the first expanded region 20. Sealing member 42 seats against shoulder 25 which prevents it from moving deeper into the coupling housing 10 when tube end 4 is inserted through opening 30 to engage the sealing member and be received in socket 12.

Retainer 44 comprises a ring sized to engage the second expanded region 26 of coupling housing 10. The ring seats within region 26 and stabilizes the retainer within the coupling housing. Preferably, coupling housing 10 has a second shoulder 56 which engages the ring to properly position retainer 44 and prevent it from moving deeper into the coupling housing 10.

Retainer 44 has a plurality of flexible, resilient teeth 60 which are arranged circumferentially around the ring and extend substantially radially inwardly thereof. Teeth 60 are angularly oriented in a direction away from opening 30 and are resiliently biased to engage outer surface 8 of tube end 4. The angular orientation of teeth 60 allows the tube end 4 to be received within opening 30 and pass through the retainer 44 and the sealing member 42 into socket 12 and seat against stop surface 16 but prevent withdrawal of the tube end 4 outwardly from the coupling. Outward motion of the tube end will tend to simultaneously compress and rotate the teeth inwardly thereby causing them to dig into tube outer surface 8 and retain the tube within the coupling in a self-jamming manner such that, as greater force is applied to withdraw the tube from the coupling the teeth 60 dig further and exert proportionally greater force to resist the outward motion until they bend or buckle.

Support washer 45 preferably comprises a radially oriented circumferential flange 62 and a collar 64, also circumferential, but oriented transversely to the radial flange 62. Radial flange 62 is in overlapping relation with and engaged by the back face 34 of lip 32 and thereby retained within the second expanded region 26. Preferably, the collar 64 extends inwardly of the pipe coupling housing 40 to engage and support the teeth 60. By continuously supporting the teeth circumferentially around the coupling, the pull-out force required to remove the tube end 4 from the coupling is increased because the teeth 60, when supported by the collar 64, will bend or buckle at a significantly higher load than when unsupported.

The coupling 40 may be used to connect the ceramic resistor 2 to the coupling housing 10 to thereby form a joint. The coupling housing 10 has an open end for receiving the first end 4 of the ceramic resistor 2. As described in more detail above, the coupling housing 10 includes a sealing member 42, a retainer 44, and a support washer 45. The retainer 44 is interposed between the support washer 45 and sealing member 42. The first end 4 of the ceramic resistor 2 is inserted into the open end of the coupling housing 10. The ceramic tube 2 is rotated therein so that the first end 4 of the ceramic resistor 2 is in sealing engagement with the sealing member 42 and retained by retaining member 44. The assembled coupling may then be connected to a liquid containing network so that liquid flows along an inner surface of the ceramic resistor, thereby cooling the resistor 2. In addition, the liquid may also flow along an outer surface of the ceramic resistor. The assembled joint is reliable and can be used in numerous high peak applications.

The assembly of the present invention provides an improved packaging, having more power without complicated attachment methods and structures. The resistor is easily changeable in a quick manner. In particular, if resistor becomes broken, it is removed, and a new resistor is easily inserted into the same fitting.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A method of assembling a resistor to a coupling, comprising:
   providing a resistor having a first end and a second end, the resistor being tubular in shape;
   providing a coupling housing having an open end for receiving the first end of the resistor, the coupling housing including a sealing member, a retainer, and a support washer, at least a portion of the retainer being interposed between the support washer and sealing member, at least a portion of the support washer contacts a radial interior surface of the retainer;
   inserting the first end of the resistor into the open end of the coupling housing; and
   rotating the resistor within the coupling housing so that the resistor is in sealing engagement with the sealing member and retained by the retainer.

2. The method of claim 1, wherein the resistor includes a metal sleeve at the first end and the second end.

3. The method of claim 1, further comprising connecting the resistor to a liquid containing network so that liquid flows along an inner surface of the resistor.

4. The method of claim 3, wherein the liquid flows along an outer surface of the resistor.

5. The method of claim 1, wherein the resistor is placed into a system so that it is electrically conductive.

6. The method of claim 1, further comprising the steps of removing a damaged resistor and inserting a new resistor into the open end of the coupling housing.

7. A resistor assembly, comprising:
- a resistor having a first end and a second end, the resistor being tubular in shape; and
- a coupling housing having an open end for receiving the first end of the resistor, the coupling housing including a sealing member, a retainer, and a support washer, at least a portion of the retainer being interposed between the support washer and sealing member, at least a portion of the support washer contacts a radial interior surface of the retainer;
- wherein the first end of the resistor is inserted into the open end of the coupling housing and rotated within the coupling housing so that the resistor is in sealing engagement with the sealing member and retained by the retainer.

8. The resistor assembly of claim 7, wherein the resistor includes a metal sleeve at the first end and the second end.

9. The resistor assembly of claim 7, wherein the resistor is connected to a liquid containing network so that liquid flows along an inner surface of the resistor.

10. The resistor assembly of claim 9, wherein the liquid flows along an outer surface of the resistor.

11. The resistor assembly of claim 7, wherein the resistor is placed into a system so that it is electrically conductive.

12. The method of claim 1, wherein the sealing member includes an angularly oriented circumferential surface sloping toward the open end of the coupling housing for guiding the first end of the resistor during insertion of the first end of the resistor into the open end of the coupling housing.

13. The method of claim 1, wherein the retainer includes a plurality of teeth arranged around a circumference of the retainer, the plurality of teeth adapted to engage an outer surface of the resistor.

14. The resistor assembly of claim 7, wherein the sealing member includes an angularly oriented circumferential surface sloping toward the open end of the coupling housing for guiding the first end of the resistor during insertion of the first end of the resistor into the open end of the coupling housing.

15. The resistor assembly of claim 7, wherein the retainer includes a plurality of teeth arranged around a circumference of the retainer, the plurality of teeth adapted to engage an outer surface of the resistor.

\* \* \* \* \*